United States Patent [19]

Ademovic

[11] Patent Number: 4,924,739
[45] Date of Patent: May 15, 1990

[54] METHOD AND APPARATUS FOR PRODUCING A CONTACT LENS

[75] Inventor: Martin K. Ademovic, Rochester, N.Y.

[73] Assignee: CooperVision, Inc., Palo Alto, Calif.

[21] Appl. No.: 623,361

[22] Filed: Jun. 22, 1984

[51] Int. Cl.⁵ .................. B23B 13/00; B23B 3/00; B29D 11/00

[52] U.S. Cl. .................. 82/1.11; 51/216 LP; 51/235; 82/165; 249/117; 264/2.7; 269/20; 279/1 R; 279/4; 425/308; 425/808

[58] Field of Search .................. 264/1.1, 2.1, 2.5, 2.7, 264/1.7, 1.8; 425/808, 289, 308, 425; 249/137, 139; 51/216 LP, 235; 82/40 R; 269/20; 279/1 R, 4, 102

[56] References Cited

U.S. PATENT DOCUMENTS

| | | | |
|---|---|---|---|
| 2,273,500 | 2/1942 | Umlandt | 425/808 |
| 2,465,677 | 3/1949 | Deverall | 269/20 |
| 3,171,663 | 3/1965 | Stark | 279/4 |
| 4,103,914 | 8/1978 | Rohm | 279/4 |
| 4,188,353 | 2/1980 | Nufe | 425/808 |
| 4,469,646 | 9/1984 | Rawlings | 264/1.1 |

FOREIGN PATENT DOCUMENTS

| | | | |
|---|---|---|---|
| 403402 | 5/1909 | France | 264/2.7 |
| 926072 | of 1963 | United Kingdom | 269/20 |

*Primary Examiner*—James Lowe
*Attorney, Agent, or Firm*—Vorys, Sater, Seymour & Pease

[57] ABSTRACT

A polymeric lens material is cast within a mold body which includes a generally conical external surface portion, an annular wall portion defining a pocket in which the material is cast, and a base wall disposed of between the conical external surface portion and the annular wall portion. The base wall defines an optical surface at the bottom of the pocket for forming a surface of a contact lens. The conical external surface portion of the mold body is dimensioned to complement an internal conical surface portion of a collet for accurately positioning and aligning the mold within the collet for a machining operation.

3 Claims, 1 Drawing Sheet

METHOD AND APPARATUS FOR PRODUCING A CONTACT LENS

BACKGROUND OF THE INVENTION

1. Field of the Invention

This invention concerns the manufacture of contact lenses and more particularly relates to the machining of contact lenses from stock material which is secured and accurately positioned within a supporting mold having an outer surface which complements an inner surface of a collet.

2. Description of the Prior Art

Contact lenses are produced by a variety of techniques including spincasting, lathing the lens from button-shaped stock material, fully molding the lens, or casting one surface of the lens within a mold and then machining the second surface following polymerization of the lens. When using the latter method, it is necessary to support the polymerizing vessel or casting mold in a lathe for subsequent machining of the exposed face of the lens. Regardless of which method is employed, a machining operation is frequently required for edging, diameter cutting or polishing the lenses.

Heretofore, the lens molds were supported by positioning or clamping them into mechanical collets mounted in a lathe spindle. The collets typically included fingers, studs, posts, pillars and springs to hold and support the molds for lathing. However, these aforementioned supporting devices were not entirely suitable for accurately and precisely machining the lenses. Accuracy, as understood in the contact lens industry, refers to precise alignment of the lens material to ensure accurate centering of an optical surface, and proper thickness control to assure a correct and suitable lens thickness for use.

These earlier collets were usually mounted onto a lathe spindle and often a series of fingers or springs had to be manually moved while the operator inserted the mold. Even with spincast lenses, the molds had to be retained on center using collets. Variations from collet assembly to collet assembly caused variations and inconsistencies in the lenses.

Accordingly, there exists the need for a method and apparatus which facilitates mounting and supporting a lens mold within a collet so as to accurately align and center the mold and lens material during a machining operation.

SUMMARY OF THE INVENTION

The lens mold according to the invention defines an optically molded surface portion and a supporting conical mold portion centrally located about the optical axis of the optical surface of the mold. The lens mold is made by injection molding which renders it disposable after lens fabrication. The mold is made from a material of sufficient rigidity to support a polymeric lens material during fabrication and to prevent any deformation of the lens mold during its loading and unloading into and from a machine. The supporting conical portion of the lens mold is constructed to intimately contact a receiving collet for precise centering of the mold relative to the center of the machine spindle. Additionally, the lens mold is constructed to enable its simple and reliable loading and unloading during any machining operation.

It is therefore an object of the invention to provide a lens mold which facilitates mounting of the mold within a machine so as to accurately align and center the mold within a collet.

It is a further object to provide an economical disposable lens mold which automatically centers itself within a collet under the application of pneumatic pressure.

Yet another object of the invention is to expedite and simplify removal of a lens mold from a collet under the application of suction.

BRIEF DESCRIPTION OF THE DRAWINGS

Various other objects, features and attendant advantages of the present invention will become better understood from the following detailed description when considered in connection with the accompanying drawings, in which the same reference characters are used to designate like or corresponding parts through the several views. In the drawings.

DETAILED DESCRIPTION OF THE PREFERRED EMBODIMENT

Figure 1:
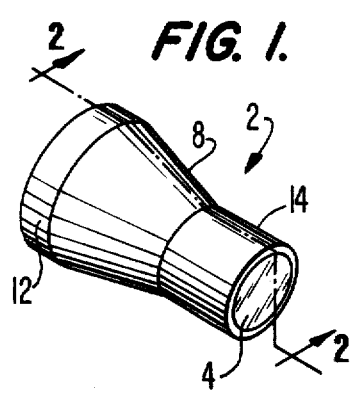
FIG. 1 is a perspective view of the lens supporting mold.
Figure 2:
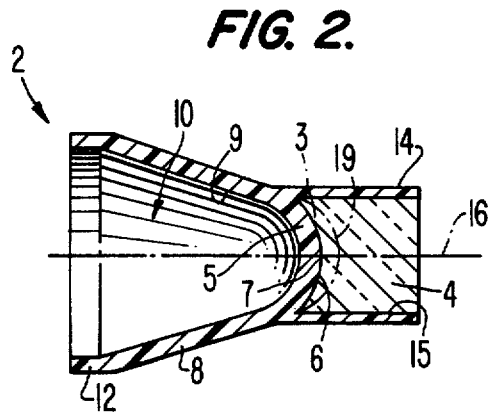
FIG. 2 is an elevational cross-sectional view of the lens supporting mold taken along line 2—2 of FIG. 1 showing an optical surface formed thereon and a polymeric contact lens material cast therein in contact with the optical surface.

The present invention in its preferred embodiment employs a mold in which a polymeric contact lens material has been cast. Mold body 2 shown in FIGS. 1 and 2 may be formed by injection molding, and includes a base wall 5 having an optical surface 6 formed thereon. In this embodiment optical surface 6 defines a base curve corresponding to one surface of contact lens 3. An annular wall 14 projects from the periphery of base wall 5 thereby defining pocket 15 which retains polymeric lens material 4 within mold 2 during polymerization and subsequent machining. A frusto-conical external surface contact section 8 is shaped for colletting, centering and wedging the mold 2 within a machine such as a lathe. An annular supporting section 12 and an internal hollow conical cavity section 10 are also formed on mold 2. The wall 9 of cavity 10 is formed substantially parallel to surface contact section 8.

Mold 2, as injection molded, is constructed to provide precise alignment about its axis of symmetry, or centerline, 16. Optical surface 6 is in alignment with axis 16 such that the centroid 7 of surface 6 is coincident with axis 16. Conical section 8 is in precise alignment with optical surface 6 and axis 16 in similar fashion. Thus, the outer surface of mold 2 can be defined as a surface of revolution about axis 16.

Annular supporting section 12 is provided at the base of conical section 8 to maintain the rigidity of the mold 2 during machining operations. Conical cavity section 10 is dimensioned to ensure maintenance of a uniform cross-section between surface 8 and wall 9 during the injection molding of mold 2. Wall 9 of conical cavity section 10 may serve as an internal support surface for further supporting mold 2 during subsequent machining and finishing operations, such as polishing.

Extending forwardly of contact section 8 and optical surface 6 is the annular supporting wall 14. This supporting wall in conjunction with optical surface 6 provides a vessel for receiving polymeric lens material 4 which is poured onto the cylindrical pocket 15 formed by surface 6 and the inner face of wall 14. Once the polymeric lens material 4 is properly polymerized and hardened, mold 2 and lens material 4 are ready for lathing.

Figure 3:
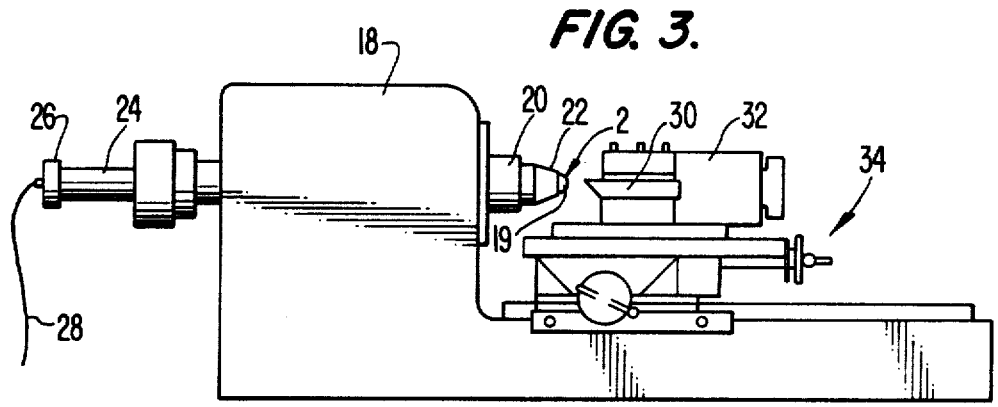
FIG. 3 is a side elevation view showing a lathe having a collet adapted for holding the lens supporting mold and further showing a mechanism for loading and unloading the mold.

FIG. 3 shows a preferred embodiment of a lathe for machining the molded lens material 4. A rotating air coupling 26 is attached to a tube feeder 24 which extends into lathe spindle 20 and is fastened to a specially shaped mold collet 22. In practice, coupling 26 is disconnected from tube feeder 24 and mold 2 is inserted into tube feeder 24 with the polymerized lens material 4 facing collet 22. Coupling 26 is affixed to tube 24 and pneumatic pressure is applied through coupling 26 via air line 28. This provides positive pressure against mold 2 and particularly against internal wall 9 of cavity 10 thereby causing the mold 2 to propel forwardly into collet 22 to become securely and accurately wedged therein. The conical cavity 10 facilitates the pneumatic propulsion of the mold 2 through the feed tube 24 and collet 22.

Figure 4:
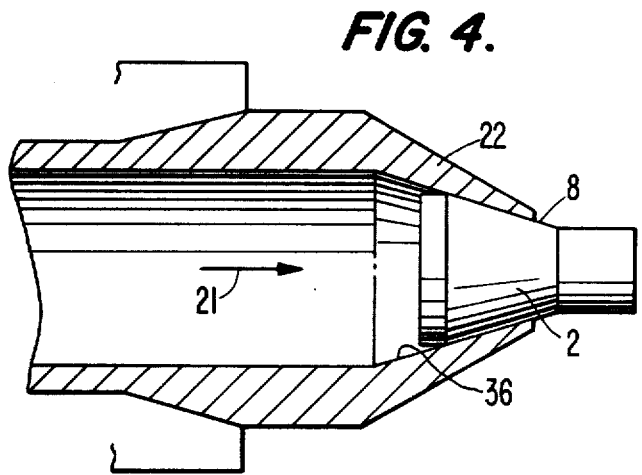
FIG. 4 is a cross-sectional elevation view showing the lens supporting mold in intimate contact with a mating collet and showing the manner in which the mold is centered and restrained in the collet.

FIG. 4 demonstrates the resulting anchoring of mold 2 rigidly and accurately within its collet 22. Mold 2 is propelled forwardly under pressure in the direction of arrow 21 and held in intimate contact against tapered internal support surface 36 provided in collet 22. Surface 36 substantially complements the surface of external contact section 8. The mold 2 is now suitably and automatically positioned within collet 22 to provide precise alignment, centering and accurate lens thickness control for a subsequent lens cutting operation.

Referring again to FIG. 3, mold 2 is shown securely positioned within lathe 18. An operator initially positions compound machine slide 34 at a desired cutting location on lathe 18 so that cutting tool 30 mounted on tool post 32 cuts an optical surface 19 on polymeric material 4. In the embodiment shown in FIG. 3, cutting tool 30 has finished cutting front surface 19 on the lens material 4. Now, with the lens 3 cut to a desired shape on mold 2, the mold is ready for removal from lathe 18. This is accomplished by providing vacuum or suction through line 28, causing negative pressure inside the feed tube 24 and collet 22, so that mold 2 is drawn back against rotating coupling 26. The operator then disconnects coupling 26, thereby removing it from feed tube 24. Mold 2 is held in place on coupling 26 and the lathe operator has merely to remove the mold, load another mold and repeat the lathing process. Alterations for automatically feeding and removing molds and automation of the lathe is of course possible.

The present invention permits the fabrication and manufacture of contact lenses, as well as any other articles having a surface of revolution, in a precise and highly reproducible fashion. It will thus be apparent that the present invention provides a new and novel method of loading and unloading lens support molds and for manufacturing contact lenses with a high degree of accuracy.

Obviously, numerous modifications and variations of the present invention are possible in light of the above teachings. It is therefore to be understood that within the scope of the appended claims, the invention may be practiced otherwise than as specifically described herein.

I claim:

1. A method for machining a contact lens supported in a mold using a lathe having a hollow spindle terminating in a first end having a conical collet having an internal conical surface of decreasing diameter toward said first end of said spindle and adapted to mate with the external conical surface of a mold support element, and a second end of said spindle having an internal diameter sufficient to receive said mold, said method comprising introducing said mold into the hollow interior of said spindle, propelling said mold by pneumatic pressure toward the end of said spindle having said conical collet whereby said interior conical surface of said collet mates with said external conical surface of said mold support element, maintaining pneumatic pressure within said spindle to hold said mold firmly in said collect during said machining.

2. The method of claim 1 which further comprises removing said support mold from said mold collet with suction.

3. The method of claim 1 which further uses a tube feeder connected to said lathe, said tube feeder pneumatically communicating with said mold collet and wherein said method further comprises propelling said support mold through said tube feeder into said collet with pneumatic pressure.

* * * * *